(12) United States Patent  
Sumiyashiki (10) Patent No.: US 6,732,967 B2  
(45) Date of Patent: May 11, 2004

(54) WEBBING RETRACTOR AND METHOD OF ASSEMBLING WEBBING RETRACTOR

(75) Inventor: Akira Sumiyashiki, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 10/294,913

(22) Filed: Nov. 15, 2002

(65) Prior Publication Data

US 2003/0116668 A1 Jun. 26, 2003

(30) Foreign Application Priority Data

Nov. 16, 2001 (JP) ........................................ 2001-352123

(51) Int. Cl.$^7$ ............................................... B65H 75/48
(52) U.S. Cl. ................. 242/376; 242/383.2; 242/383.5; 242/384.6
(58) Field of Search ............................... 242/376, 383.2, 242/383.5, 384.6; 280/805, 806; 297/478

(56) References Cited

U.S. PATENT DOCUMENTS

| | | | | |
|---|---|---|---|---|
| 5,482,224 A | * | 1/1996 | Fujimura et al. | ............ 242/376 |
| 6,068,208 A | * | 5/2000 | Matsuki et al. | .......... 242/383.2 |
| 6,443,382 B1 | * | 9/2002 | Bae | .......................... 280/806 |
| 6,527,214 B2 | * | 3/2003 | Sumiyashiki | ............ 242/383.2 |
| 6,530,536 B2 | * | 3/2003 | Sumiyashiki et al. | .... 242/383.2 |

\* cited by examiner

*Primary Examiner*—William A. Rivera  
(74) *Attorney, Agent, or Firm*—Nixon Peabody, LLP (57) ABSTRACT

In a webbing retractor, a stopper plate is mounted to a belt insert-through hole of a spool. In this mounted state, a restricting wall of the stopper plate extends further outward in a radial direction of a spool main body than an outer peripheral portion of the spool main body. From between a pair of leg plates of a frame, the restricting wall opposes the leg plates along an axial direction of the spool. Thus, when force displacing the spool in the axial direction of the spool is applied, the leg plates interfere with the restricting wall, and indirectly interfere with the spool so as to restrict displacement of the spool.

20 Claims, 7 Drawing Sheets

WEBBING RETRACTOR AND METHOD OF ASSEMBLING WEBBING RETRACTOR

BACKGROUND OF THE INVENTION

1. Field of the Invention

The present invention relates to a webbing retractor which forms a seat belt device of a vehicle, and to a method of assembling a webbing retractor for assembling this type of webbing retractor.

2. Description of the Related Art

One longitudinal direction end portion of a webbing belt, which forms a seat belt device for restraining the body of a vehicle occupant seated in a seat of a vehicle, is anchored on the take-up shaft of a webbing retractor which is provided, for example, at the side of the seat. The other end of the webbing belt is fixed at an anchor plate provided in a vicinity of the webbing retractor. Above the retractor, e.g., at the upper end of the center pillar of the vehicle, the intermediate portion in the longitudinal direction of the webbing belt is passed through an insert-through hole formed in a through-anchor, and is folded back downwardly.

The portion of the webbing belt between the other end thereof and the folded-back portion thereof at the through-anchor passes through an insert-through hole of a tongue plate. By pulling the tongue plate, the webbing belt, which is taken-up on the take-up shaft of the retractor, is pulled out. Then, when the tongue plate is connected to a buckle device provided at the side of the seat opposite the side at which the retractor is provided, the webbing belt is set in a state of being applied to the vehicle occupant.

In a webbing retractor such as that described above, a supporting member, which is made of resin and is mounted to a power spring which urges the take-up shaft, and a gear, which is made of resin and which forms a lock mechanism which restricts rotation of the take-up shaft in the direction of pulling out the webbing belt when the vehicle is in a state of rapid deceleration, are mounted to the axial direction ends of the take-up shaft. The supporting member and the gear and the like are supported via other members at a pair of leg plates forming a frame. The take-up shaft is thereby shaft-supported at the frame so as to be freely rotatable.

When the take-up shaft rotates, and in particular, when the take-up shaft rotates due to the webbing belt being pulled-out suddenly, there are cases in which the take-up shaft does not only rotate around the axial center thereof, but also attempts to shift along the axial direction thereof.

As described above, resin members are mounted to the both ends of the take-up shaft. Because the take-up shaft is supported via these resin members, when the take-up shaft attempts to shift in the axial direction thereof due to excessive force, the force thereof is applied to the resin members.

Depending on the type of the webbing retractor, there are cases in which a take-up shaft, whose entire length along the axial direction thereof is longer than the interval between the pair of leg plates, is used.

In this type of webbing retractor, it has been thought to pass the take-up shaft through ratchet holes of the leg plates, which ratchet holes form the aforementioned lock mechanism, so as to dispose the take-up shaft at a predetermined position with respect to the pair of leg plates.

However, when shifting (displacement) of the take-up shaft in the axial direction such as described above arises, the take-up shaft attempts to come out from the ratchet holes. Therefore, the assembly process of simply passing the take-up shaft through the ratchet holes of the leg plates and disposing the take-up shaft at a predetermined position with respect to the pair of leg plates, is difficult. As a result, the bothersome assembly process of mounting the take-up shaft to the frame while moving the take-up shaft complexly and in three dimensions, has been carried out.

SUMMARY OF THE INVENTION

In view of the aforementioned, an object of the present invention is to provide a webbing retractor and a method of assembling the webbing retractor in which displacement (shifting) in the axial direction of a take-up shaft with respect to a frame can be restricted with a simple structure, and assembly of the take-up shaft to the frame is made easy.

A webbing retractor of a first aspect of the present invention has a take-up shaft, a frame, and a take-up shaft stopper device. The take-up shaft is a member on which the proximal end portion of an elongated, strip-shaped webbing belt is anchored, and which takes up the webbing belt from the proximal end side thereof by rotating in a take-up direction which is one direction around an axial center of the take-up shaft. The frame is a member having a pair of leg plates which oppose one another along an axial direction of the take-up shaft, and which indirectly supports the take-up shaft at the leg plates. The take-up shaft stopper device is a member which is mounted to one portion of an outer periphery of the take-up shaft from a direction orthogonal to the axial direction of the take-up shaft. The take-up shaft stopper device has a restricting wall. In the state in which the take-up shaft stopper device is mounted, the restricting wall extends further than the take-up shaft in the direction orthogonal to the axial direction of the take-up shaft, and opposes the leg plates along the axial direction of the take-up shaft.

In the webbing retractor having the above-described structure, the proximal end portion of the elongated, strip-shaped webbing belt is anchored on the take-up shaft which is indirectly supported at the pair of leg plates of the frame. Due to the take-up shaft rotating in the take-up direction which is one direction around the axis thereof, the webbing belt is taken-up onto and accommodated on the take-up shaft.

In this accommodated state, by rotating the take-up shaft in the pull-out direction which is opposite to the take-up direction by pulling the distal end side of the webbing belt, the webbing belt which is taken-up on the take-up shaft is pulled out. Due to a vehicle occupant making the webbing belt, which has been pulled out, span across his/her body at the front side of his/her body, the webbing belt is applied to the body of the vehicle occupant.

In cases such as those described above in which the webbing belt is taken-up on the take-up shaft and accommodated, or the webbing belt which has been taken up on the take-up shaft is pulled out, or the like, when the take-up shaft is rotated, the rotational force is applied not only in the direction around the axis of the take-up shaft, but also in the axial direction of the take-up shaft, and the take-up shaft attempts to shift in the axial direction thereof with respect to the frame.

In the present webbing retractor, the restricting wall of the take-up shaft stopper device, which is mounted to one portion of the outer periphery of the take-up shaft, extends further outwardly than the take-up shaft in the direction orthogonal to the axis of the take-up shaft. The restricting wall opposes the pair of leg plates along the axial direction of the take-up shaft. Thus, when the take-up shaft attempts to shift in the axial direction, the leg plates interfere, via the restricting wall, with the take-up shaft to which the take-up shaft stopper device is mounted. In this way, displacement of the take-up shaft along the axial direction is restricted.

In this way, displacement of the take-up shaft along the axial direction can be restricted even in a structure in which, for example, the interval between the pair of leg plates is shorter than the axial direction dimension of the take-up shaft and the take-up shaft is supported at the pair of leg plates indirectly by another connecting member or the like in the state in which the take-up shaft has been passed through holes formed coaxially in the pair of leg plates. Accordingly, the take-up shaft can be prevented from coming out from the holes, and it is possible to prevent an excessive load from being applied to the other connecting member due to displacement of the take-up shaft. Thus, the present webbing retractor can reliably be operated over a long period of time.

Moreover, the take-up shaft stopper device is structured so as to be mounted to the outer peripheral portion of the take-up shaft from a direction orthogonal to the axial direction of the take-up shaft. Thus, when the take-up shaft stopper device is mounted to the outer peripheral portion of the take-up shaft, the leg plates of the frame and the like do not interfere with the take-up shaft stopper device. In this way, basically, the take-up shaft stopper device can be mounted to the take-up shaft in a state in which the take-up shaft stopper device is set at a predetermined position of the take-up shaft with respect to the frame.

Thus, basically, because the take-up shaft stopper device can be mounted to the take-up shaft simply, the operational efficiency of the assembly work is extremely good.

Displacement of the take-up shaft along the axial direction is restricted due to the leg plates interfering with the take-up shaft stopper device. Thus, there is no longer the need to make the direction of assembling the take-up shaft to the frame complex, and no longer the need to restrict displacement of the take-up shaft along the axial direction. Namely, in the present webbing retractor, the direction of assembling the take-up shaft to the frame can be simplified, and the assembly efficiency can thereby be improved.

The webbing retractor of the present invention may be provided with a belt stopper device. A belt insert-through hole is formed in the take-up shaft, both ends of the belt insert-through hole are open at an outer peripheral portion of the take-up shaft, the proximal end side of the webbing belt is inserted through from one open end of the belt-insert through hole, and the take-up shaft stopper device is mounted from another open end of the belt-insert through hole. The belt stopper device is a device which engages the proximal end side of the webbing belt which has been inserted through the belt insert-through hole from the other open end of the belt-insert through hole, and which, in an engaged state, interferes one of directly and indirectly with an inner wall of the belt-insert through hole so as to prevent the webbing belt from coming out from the one open end of the belt insert-through hole, and which interferes with the take-up shaft stopper device from the other open end of the belt-insert through hole so as to prevent the take-up shaft stopper device from coming out from the other open end of the belt-insert through hole.

In the webbing retractor having the above-described structure, from the other open end of the belt insert-through hole, the belt stopper device engages with the proximal end side of the webbing belt which has been inserted through from the one open end of the belt insert-through hole formed in the take-up shaft. In this state, when the webbing belt is pulled toward the distal end side thereof, the inner wall of the belt insert-through hole interferes with the belt stopper device, and, via the belt stopper device, the proximal end side of the webbing belt is prevented from coming out from the one open end of the belt insert-through hole.

Here, in the present webbing retractor, the take-up shaft stopper device is mounted to the take-up shaft from the other open end of the belt insert-through hole. Moreover, in this mounted state, the belt stopper device, which engages with proximal end side of the webbing belt, interferes with the take-up shaft stopper device from the other open end of the belt insert-through hole. It is thereby possible to prevent the take-up shaft stopper device from coming out from the other open end of the belt insert-through hole.

In this way, in the present webbing retractor, the take-up shaft stopper device is mounted to the take-up shaft by the structure for anchoring the webbing belt to the take-up shaft, which structure is the belt insert-through hole and the belt stopper device. Thus, there is no need for a special structure for mounting the take-up shaft stopper device to the take-up shaft, and the costs can be made to be less expensive.

A webbing retractor of a second aspect of the present invention has a take-up shaft, a frame, a lock device and a stopper portion. The take-up shaft is a member on which a proximal end portion of an elongated, strip-shaped webbing belt is anchored, and takes-up the webbing belt from the proximal end side of the webbing belt by rotating in the take-up direction which is one direction around an axial center of the take-up shaft. The frame is a member which includes a pair of leg plates which are provided so as to oppose one another along an axial direction of the take-up shaft, an interval between the leg plates being shorter than a dimension between axial direction end portions of the take-up shaft, and a hole is formed in each of the leg plates, and the take-up shaft can be made to pass through the holes, and internal teeth are formed at an inner peripheral portion of at least one of the holes, and the frame indirectly supports the take-up shaft which has been passed through the holes. The lock device is a device which has a lock member, and which moves the lock member in directions of approaching and moving away from the inner peripheral portions of the holes under a predetermined condition. The lock member is a member which is provided at the take-up shaft so as to be movable in directions of approaching and moving away from the inner peripheral portions of the holes formed in the leg plates. A plurality of external teeth which can engage with the internal teeth are formed at the lock member. Due to the lock member moving so as to approach the inner peripheral portions of the holes, the lock member engages with the internal teeth formed at the inner peripheral portion of the hole, and restricts rotation of the take-up shaft in a direction of pulling-out the webbing belt. The stopper portion is provided at the take-up shaft so as to be movable in directions of approaching and moving away from a restricting position at a side, along a direction in which the leg plates oppose one another, of the leg plate which has the internal teeth, one of integrally with movement of and interlockingly with movement of the lock member in directions of approaching and moving away from the inner peripheral portions of the holes.

In the webbing retractor having the above-described structure, the proximal end portion of the elongated, strip-shaped webbing belt is anchored on the take-up shaft which is supported indirectly at the pair of leg plates of the frame. Due to the take-up shaft being rotated in the take-up direction which is one direction around the axis thereof, the webbing belt is taken-up and accommodated on the take-up shaft.

In this accommodated state, by rotating the take-up shaft in the pull-out direction which is opposite to the take-up direction by pulling the distal end side of the webbing belt, the webbing belt which is taken-up on the take-up shaft is pulled out. Due to a vehicle occupant making the webbing belt, which has been pulled out, span across his/her body at the front side of his/her body, the webbing belt is applied to the body of the vehicle occupant.

Under a predetermined condition such as when there is a rapid deceleration of the vehicle or when the webbing belt is pulled-out suddenly, the lock member which forms the lock device moves in the direction of approaching the internal teeth which are formed at the inner peripheral portion of at least one of the holes formed in the pair of leg plates, and the lock member engages with the internal teeth. In this way, rotation of the take-up shaft in the pull-out direction is restricted, and pulling-out of the webbing belt is thereby restricted.

Here, as described above, when the lock member moves in the direction of approaching the internal teeth, the restricting portion moves to the restricting position either integrally or interlockingly therewith. The restricting portion which has moved to the restricting position opposes, along the axial direction of the take-up shaft, the leg plate which has the internal teeth. Thus, in this state, if the take-up shaft attempts to shift in the axial direction, the leg plate which has the internal teeth interferes with the stopper portion, and the take-up shaft is interfered with via the stopper portion. As a result, displacement of the take-up shaft along the axial direction at the time the lock member moves (i.e., under the aforementioned predetermined condition) is restricted.

In this way, the take-up shaft can be prevented from coming out from the holes in which the internal teeth are formed, and it is possible to prevent an excessive load from being applied to another connecting member due to displacement of the take-up shaft. Thus, the present webbing retractor can reliably be operated over a long period of time.

When the webbing retractor includes the stopper portion, the stopper portion may be formed between the plurality of external teeth.

In the webbing device having the above-described structure, the stopper portion is formed between the plurality of external teeth formed at the lock member. Accordingly, when the lock member moves to approach the internal teeth and the external teeth engage with the internal teeth, the stopper portion is positioned at the side of the internal teeth along the axial direction of the take-up shaft. In this state, if the take-up shaft attempts to shift along the axial direction, the internal teeth interfere with the stopper portion, and, via the stopper portion and the lock member, the internal teeth interfere with the take-up shaft at which the lock member is provided. In this way, displacement of the take-up shaft along the axial direction is restricted.

A third aspect of the present invention relates to a method of assembling a webbing retractor. This method is applied to a webbing retractor having: a take-up shaft on which a proximal end portion of an elongated, strip-shaped webbing belt is anchored; and a frame having a pair of leg plates which oppose one another along an axial direction of the take-up shaft, and an interval between the leg plates is smaller than an axial direction dimension of the take-up shaft, and a hole through which the take-up shaft can pass is formed in each of the leg plates, and the frame indirectly shaft-supports the take-up shaft at the pair of leg plates. This method has a step of mounting the take-up shaft to the frame. The step of mounting the take-up shaft to the frame comprises the following two steps. The first step is a take-up shaft pass-through step of passing the take-up shaft, from one axial direction end side of the take-up shaft and along the axial direction of the take-up shaft, through the hole formed in one of the leg plates, from a side of the one of the leg plates which side is opposite a side at which another of the leg plates is provided, and passing the take-up shaft, from the one axial direction end side of the take-up shaft, through the hole formed in the other of the leg plates. The second step is a take-up shaft stopper device mounting step of mounting a take-up shaft stopper device to one portion of an outer periphery of the take-up shaft, between the pair of leg plates and from a direction orthogonal to the axial direction of the take-up shaft, and making a restricting wall, which is formed at the take-up shaft stopper device and extends further toward an outer side in a direction orthogonal to the axial direction of the take-up shaft than the take-up shaft, oppose the leg plates along the axial direction of the take-up shaft.

In the above-described method of assembling a webbing retractor, when the take-up shaft is mounted to the frame, first, in the take-up shaft pass-through step, the take-up shaft is passed, from the axial direction one end side of the take-up shaft and along the axial direction of the take-up shaft, through the hole formed in one of the leg plates forming the frame, from a side of the one of the leg plates which side is opposite the side at which the other leg plate is provided. Then, the take-up shaft is passed, from the one axial direction end side thereof, through the hole formed in the other leg plate.

Next, in the take-up shaft stopper device mounting step, the take-up shaft stopper device is mounted to one portion of an outer periphery of the take-up shaft, between the pair of leg plates and from a direction orthogonal to the axial direction of the take-up shaft.

In this state in which the take-up shaft stopper device is mounted, the restricting wall formed at the take-up shaft stopper device extends further than the take-up shaft toward an outer side in a direction orthogonal to the axial direction of the take-up shaft, and opposes the leg plates along the axial direction of the take-up shaft. Accordingly, if the take-up shaft attempts to shift along the axial direction, the leg plates interfere with the restricting wall, and the leg plates interfere with the take-up shaft indirectly via the restricting wall (the take-up shaft stopper device). In this way, displacement of the take-up shaft along the axial direction is restricted, and the take-up shaft can be prevented from coming out via the holes.

Here, in the present method for assembling a webbing retractor, as described above, by mounting the take-up shaft stopper device to the take-up shaft in the take-up shaft stopper device mounting step, displacement of the take-up shaft along the axial direction is restricted. Thus, when positioning the take-up shaft at a predetermined position of the frame, the take-up shaft passthrough step, which passes the take-up shaft through the holes formed in the leg plates along the axial direction of the take-up shaft, alone suffices.

In this way, in the present method for assembling a webbing retractor, the mounting of the take-up shaft to the frame is simple. Therefore, assembly is easy, and it is possible to reduce the number of assembly steps.

DESCRIPTION OF THE PREFERRED EMBODIMENTS

<Structure of the Present Embodiment>

Figure 1:
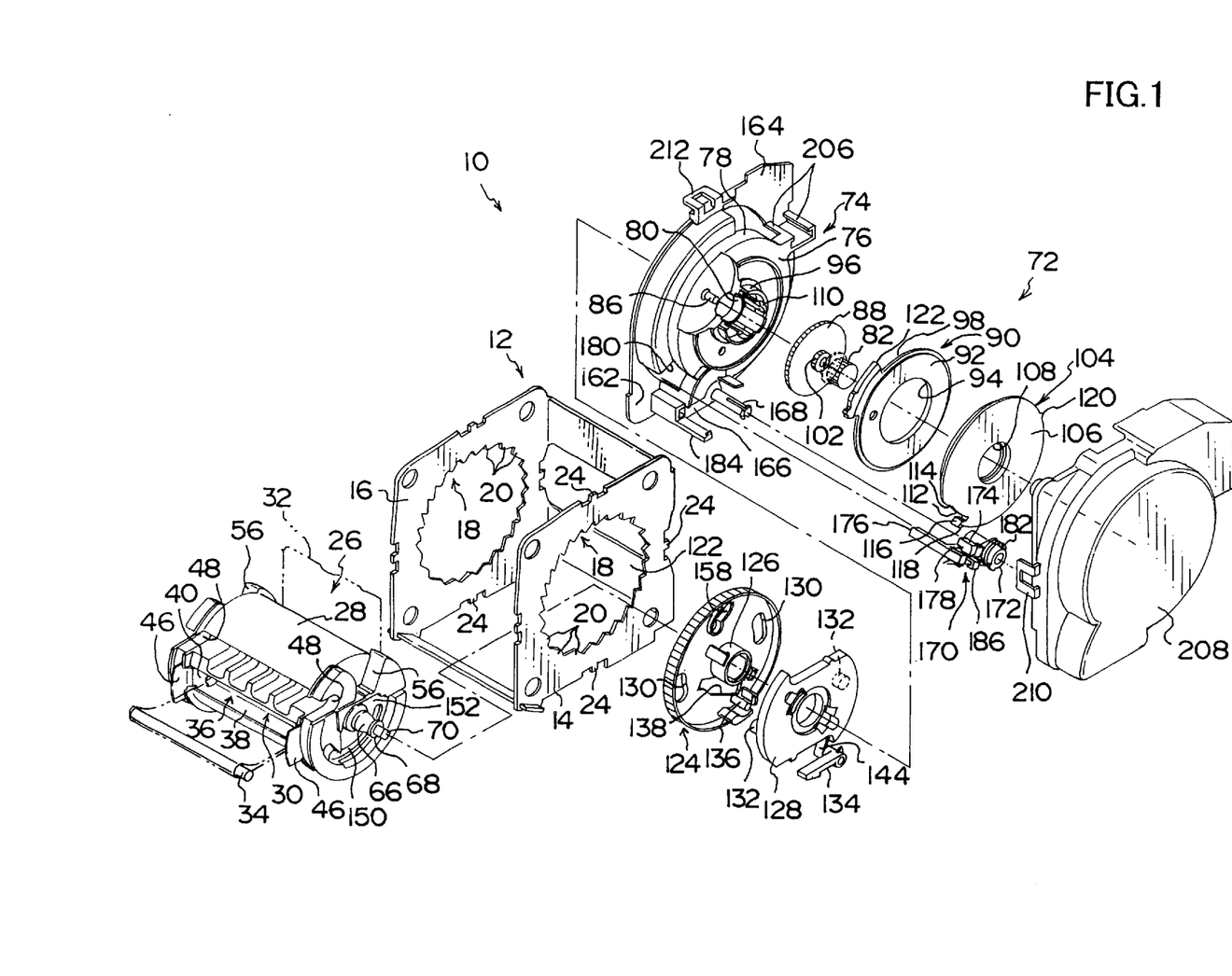
FIG. 1 is an exploded perspective view showing the structure of main portions of a webbing retractor relating to an embodiment of the present invention.

In FIG. 1, the structures of the main portions of a webbing retractor 10 relating to an embodiment of the present invention are shown in an exploded perspective view.

(Structure of Frame 12)

As shown in FIG. 1, the webbing retractor 10 has a frame 12. The frame 12 has a pair of leg plates 14, 16. Each leg plate 14, 16 is formed in the form of a flat plate which is a substantially square shape which is one type of a substantially polygonal shape (i.e., each leg plate 14, 16 is substantially square, and substantially square is one example of substantially polygonal). The leg plates 14, 16 oppose one another along the directions of thickness thereof.

A ratchet hole 18 serving as a hole is formed in each of the leg plates 14, 16. The ratchet hole 18 is formed by a plurality of internal teeth 20. The centers of the ratchet holes 18 are substantially coaxial with respect to the centers of the leg plates 14, 16.

A connecting plate 22 is provided at ones of end portions of the leg plates 14, 16 in a direction (which, for convenience, will hereinafter be termed the transverse direction of the leg plates 14, 16) which is orthogonal to both the heightwise direction of the webbing retractor 10 (which will hereinafter simply be called the "heightwise direction") and the direction in which the leg plates 14, 16 oppose one another.

The connecting plate 22 is integrally connected with the ones of end portions in the transverse direction of the leg plates 14, 16, further toward the lower sides than the central portions of the leg plates 14, 16 along the heightwise direction. The webbing retractor 10 is mounted to a vehicle body by mounting the connecting plate 22 to a predetermined region (not illustrated) for mounting the retractor, which region is provided at the vehicle body. Four holding projections 24 are formed at the outer peripheral portion of the leg plate 14. The holding projections 24 are each a member serving as a holding portion. The holding projections 24 are formed at the substantial centers of the respective sides of the leg plate 14 when the leg plate 14 is presumed to be square.

(Structure of Spool 26)

A spool 26 serving as a take-up shaft is provided at the frame 12. The spool 26 has a spool main body 28. The spool main body 28 is formed in a substantially solid cylindrical configuration or a substantially hollow cylindrical configuration whose axial direction runs along the direction in which the leg plates 14, 16 oppose one another. The axial direction dimension of the spool main body 28 is longer than the interval between the leg plate 14 and the leg plate 16.

The maximum outer diameter of the spool main body 28 is smaller than the inner diameters of the ratchet holes 18 (more specifically, is smaller than the diameters of imaginary circles formed by connecting the distal end portions of the plural internal teeth 20 forming the ratchet holes 18). Accordingly, the spool 26 cannot be disposed between the leg plates 14, 16 from the widthwise direction side and the heightwise direction side of the leg plates 14, 16. However, the central portion in the axial direction of the spool main body 28 can be disposed between the leg plate 14 and the leg plate 16 by the spool 26 being passed through the ratchet holes 18.

Figure 2:
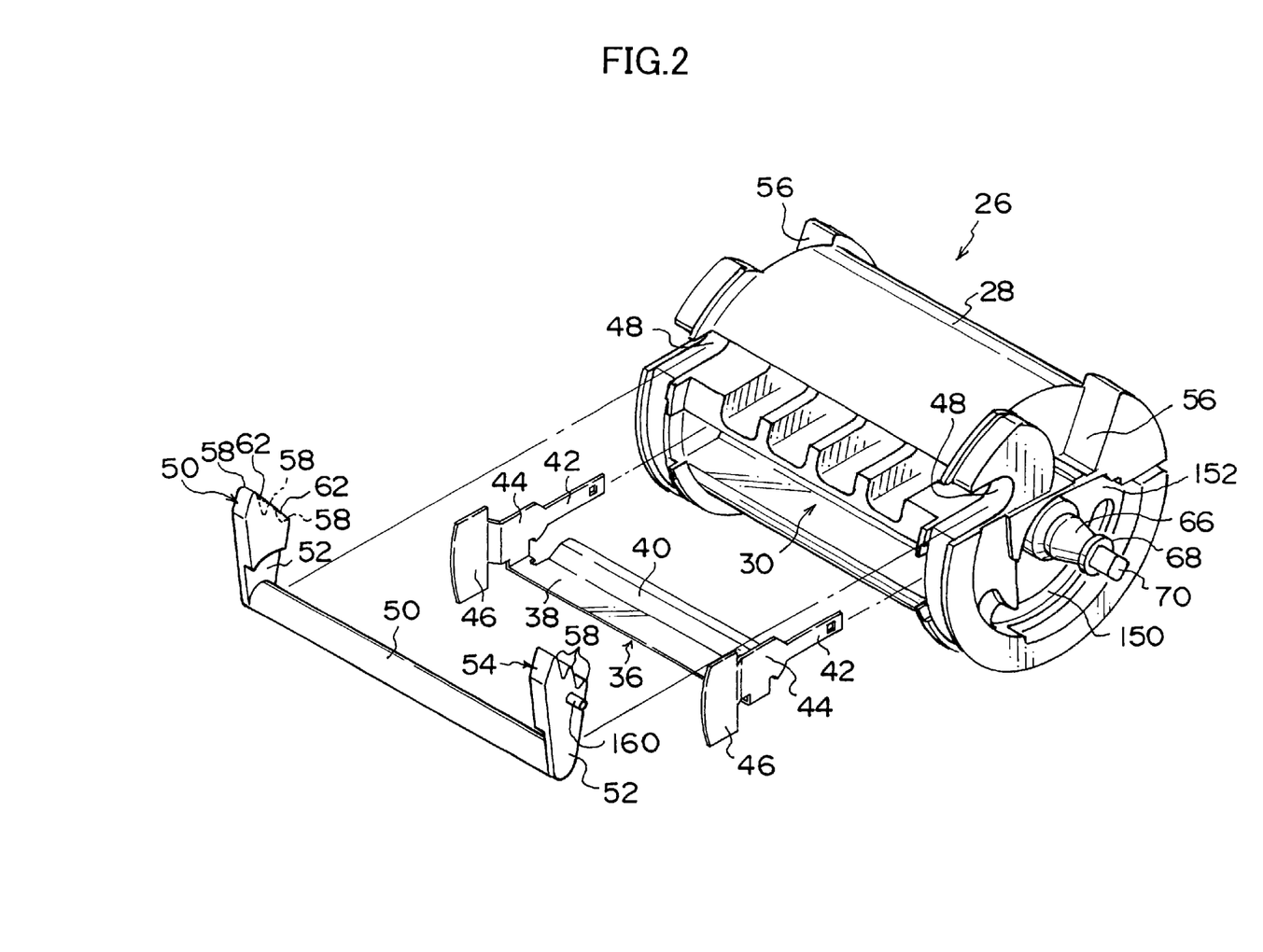
FIG. 2 is an enlarged perspective view of a take-up shaft, and a lock member and a take-up shaft stopper device which are mounted to the take-up shaft.

As shown in FIGS. 1 and 2, a belt insert-through hole 30, whose both ends are open at the outer peripheral portion of the spool main body 28, is formed in the spool main body 28. The belt insert-through hole 30 is a slit hole at which the longitudinal directions of the openings thereof run along the axial direction of the spool main body 28. The proximal end portion of a webbing belt 32 shown in FIG. 1 is inserted through the belt-insert through hole 30.

As shown in FIG. 2, at the belt insert-through hole 30, the width of the opening at one end side which is further toward one end than an intermediate portion in the direction in which the belt insert-through hole 30 passes through the spool main body 28, is larger than the width of the opening at the other end side. A stopper shaft 34 serving as a belt stopper device is provided at the one end side of the belt insert-through hole 30. The stopper shaft 34 is a solid cylindrical member whose longitudinal direction runs along the axial direction of the spool main body 28. The outer diameter of the stopper shaft 34 is smaller than the width of the opening at the one end side of the belt insert-through hole 30, and is larger than the width of the opening at the other end side.

The stopper shaft 34 is inserted in the inner side of the proximal end portion of the webbing belt 32 which is formed in a closed annular shape and which is inserted through from the other end side toward the one end side of the belt insert-through hole 30. In this way, even if the webbing belt 32 is pulled toward the distal end side thereof and an attempt is made to pull the proximal end side thereof out from the belt insert-through hole 30, the stopper shaft 34, via the webbing belt 32, interferes with the inner wall of the belt insert-through hole 30 at the intermediate portion in the direction in which the belt insert-through hole 30 passes through.

A stopper plate 36 serving as a take-up shaft stopper device is provided at the belt insert-through hole 30. The stopper plate 36 has a connecting plate 38 whose longitudinal direction runs along the axial direction of the stopper main body 28. The longitudinal direction dimension of the connecting plate 38 is slightly smaller than the longitudinal direction dimension of the opening of the belt insert-through hole 30.

Interfering walls 40 are formed from the both end portions in the longitudinal direction of the connecting plate 38, so as to be curved toward one side in the thickness direction of the connecting plate 38. Each interfering wall 40 is formed by a narrow width portion 42 and a wide width portion 44. The width of the narrow width portion 42 is substantially the same as (more specifically, is slightly smaller than) the width of the belt insert-through hole 30 at the other end side thereof. The width of the wide width portion 44 which is continuous with the narrow width portion 42 is substantially the same as (more specifically, is slightly smaller than) the width of the belt insert-through hole 30 at the one end side thereof. Accordingly, when the interfering walls 40 are inserted from the one end side of the belt insert-through hole 30, the wide width portions 44 interfere with the inner walls of the belt insert-through hole 30 at predetermined positions, and further movement thereof toward the other end side of the belt insert-through hole 30 is restricted.

Restricting walls 46 extend out from the end portions of the wide width portions 44 at the sides opposite the narrow width portions 42. The restricting walls 46 first extend out from the wide width portions 44 so as to be curved outwardly in the longitudinal direction of the connecting plate 38. At the sides further toward the distal ends than these curved portions, the restricting wall 46, which is formed at one of the interfering walls 40, and the restricting wall 46, which is formed at the other of the interfering walls 40, oppose one another along the longitudinal direction of the connecting plate 38.

The interval between the restricting walls 46 is extremely slightly smaller than the interval between the leg plates 14, 16. The dimension at which the restricting wall 46 extends out from the wide width portion 44 is such that, in a state in which the stopper plate 36 is mounted to the spool main body 28 at which the stopper plate 36 is inserted in the belt insert-through hole 30, the end portion of the restricting wall 46 at the side opposite the wide width portion 44 is positioned at the outer side, in the radial direction, of the internal teeth 20 of the ratchet hole 18 formed in the leg plate 14.

As shown in FIG. 2, shaft receiving portions 48 are formed in the spool main body 28. The shaft receiving portions 48 are formed by notching portions of the outer periphery of the spool main body 28 so as to pass through in the axial direction. A shaft 50 is accommodated, at the inner sides of the shaft receiving portions 48, so as to be rotatable around the axial direction of the spool main body 28.

A plate-shaped connecting plate 52 extends out toward one side in a rotational radial direction of the shaft 50, from each end portion in the axial direction of the shaft 50. A lock plate 54 serving as a lock member is formed at the end portion of the connecting plate 52 at the side opposite the shaft 50. The lock plate 54 is formed in the shape of a plate or a block which is thicker than the connecting plate 52.

An accommodating groove 56 is formed in each end portion in the axial direction of the spool main body 28, so as to correspond to the lock plates 54. Basically, the lock plates 54 enter into and are accommodated in the accommodating grooves 56. In the state in which the lock plates 54 are accommodated in the accommodating grooves 56, the lock plates 54 are positioned further toward the inner sides than the outer peripheral portion of the spool main body 28.

Further, a ratchet 58 which is formed by a plurality of external teeth (i.e., which serves as external teeth) is formed at a portion of the outer periphery of each lock plate 54. The ratchets 58 are formed so as to be positioned at the inner sides in the radial directions of the ratchet holes 18. When the shaft 50 rotates around its own axis and the lock plates 54 come out from the accommodating grooves 56, the ratchets 58 mesh with the internal teeth 20 of the ratchet holes 18.

With regard to the rotation of the spool 26 in directions around the axis thereof, in the state in which the ratchets 58 mesh with the internal teeth 20, rotation in a take-up direction of taking up the webbing belt 32 from the proximal end side thereof is permitted. However, rotation in the pull-out direction, which is opposite to the take-up direction, is restricted.

A restricting plate 62 serving as a stopper portion extends out from an end portion of the lock plate 54 at the central side in the axial direction of the shaft 50. The restricting plate 62 is formed so as to be positioned between the plurality of external teeth of the ratchet 58. In the state in which the ratchets 58 are meshing with the internal teeth 20 of the ratchet holes 18, the restricting plates 62 oppose the internal teeth 20 along the axial direction of the spool 26 between the leg plate 14 and the leg plate 16.

A substantially-plate shaped fit-together plate, which is unillustrated, extends out substantially from the axially central portion of one end portion in the axial direction of the spool main body 28. In correspondence therewith, an unillustrated power spring unit is mounted to the side of the leg plate 16 opposite the side at which the leg plate 14 is located.

This power spring unit has a power spring. The fit-together plate is connected either directly or indirectly to the end portion of the power spring at the inner side in the direction in which the power spring spirals. The spool 26 is urged in the take-up direction by the urging force of the power spring.

A shaft 66, which is coaxial with the spool main body 28, extends out from the other end portion in the axial direction of the spool main body 28. A disc-shaped flange portion 68 is formed coaxially with the shaft 66 at the distal end portion of the shaft 66. A fit-together piece 70 which is substantially cubic is formed at the surface of the flange portion 68 at the side opposite the shaft 66.

(Structure of Lock Mechanism 72)

As shown in FIG. 1, a lock mechanism 72 serving as a lock device is provided at the side of the leg plate 14 opposite the side at which the leg plate 16 is provided. The lock mechanism 72 has a sensor holder 74 serving as a supporting member. The sensor holder 74 has a holder main body 78 which is shaped as a hollow cylinder having a bottom, and whose axial direction dimension is short, and whose end portion at the side opposite the leg plate 14 along the axial direction is closed by a bottom wall 76.

A hollow cylindrical shaft receiving portion 80, which passes through along the axial direction of the spool 26, is formed substantially at the central portion of the bottom wall 76 of the holder main body 78. A gear 82 is shaft-supported so as to be freely rotatable at the shaft receiving portion 80. An unillustrated rectangular fit-together hole is formed in the leg plate 16 side end portion of the gear 82 along the axial direction of the spool 26. The fit-together piece 70 is fit-together with this fit-together hole. The gear 82 thereby rotates coaxially and integrally with the spool 26.

A shaft 86 is formed to project from the outer side surface of the bottom wall 76. The longitudinal direction of the shaft 86 is the same direction as the axial direction of the gear 82, and the shaft 86 is formed at a position which is eccentric with respect to the shaft receiving portion 80. A large diameter gear 88, which has more teeth than the gear 82, is shaft-supported so as to be freely rotatable at the shaft 86. The large diameter gear 88 rotates around the shaft 86 in a state in which the large diameter gear 88 meshes with the gear 82 and the rotational speed thereof is reduced to less than the rotational speed of the gear 82 due to the rotation of the gear 82.

Further, a rotating plate 90 is provided at the side of the large diameter gear 88 opposite the side at which the bottom wall 76 is provided. The rotating plate 90 has a substantially disc-shaped bottom wall 92. A circular hole 94 is formed in the bottom wall 92. The bottom wall 92 is shaft-supported so as to be freely rotatable at a shaft receiving portion 96 which is formed coaxially with the shaft receiving portion 80 at the outer side surface of the bottom wall 76. A ring-shaped peripheral wall 98 is formed at the bottom wall 76 side surface of the bottom wall 92. Unillustrated internal teeth are formed at the inner peripheral portion of the peripheral wall 98.

A small diameter gear 102 is formed coaxially at the large diameter gear 88 so as to correspond to the internal teeth of the rotating plate 90. The small diameter gear 102 meshes with the internal teeth of the rotating plate 90. The small diameter gear 102 has a number of teeth which is less than the numbers of internal teeth of the large diameter gear 88 and the rotating plate 90. Accordingly, the rotation of the large diameter gear 88 is transmitted to the rotating plate 90 in a decelerated (reduced) state.

A rotating plate 104 is provided at the side of the rotating plate 90 opposite the side at which the bottom wall 76 is provided. The rotating plate 104 has a substantially disc-shaped bottom wall 106. A circular hole 108 is formed in the bottom wall 106. The rotating plate 104 is shaft-supported so as to be freely rotatable at a shaft receiving portion 110 formed coaxially with the shaft receiving portion 80 at the outer side surface of the bottom wall 76.

A cut-out portion 112 is formed in one portion of the outer periphery of the bottom wall 106. The cut-out portion 112 opens toward the outer side in the radial direction of the bottom wall 106. One of the pair of inner walls of the cut-out portion 112 directed in the peripheral direction of the bottom wall 106 is an inclined portion 114 whose distance from the center of the bottom wall 106 gradually increases as this one inner wall extends in the peripheral direction of the bottom wall 106 from the bottom portion side end portion of the cut-out portion 112.

The inner wall of the cut-out portion 112 at the side opposite the inclined portion 114 is an interfering wall 116. The interfering wall 116 extends further toward the rotating plate 90 than the bottom wall 106. One portion of the interfering wall 116 is positioned at the outer side of the outer peripheral portion of the rotating plate 90. A peripheral wall 118 is formed from the interfering wall 116 toward the side opposite the inclined portion 114 and along the outer peripheral portion of the bottom wall 106. An interfering wall 120 having a structure similar to that of the interfering wall 116 is formed at the end portion of the peripheral wall 118 at the side opposite the side at which the interfering wall 116 is located.

A cam 122 is formed at the outer peripheral portion of the rotating plate 90 in correspondence with the interfering walls 116, 120. The cam 122 is formed over a given range at the outer peripheral portion of the rotating plate 90 along the peripheral direction of the rotating plate 90. The peripheral direction end portions of the cam 122 oppose the interfering walls 116, 120 along the rotational peripheral directions of the rotating plates 90, 104.

A V gear 124 serving as a rotating body is accommodated at the inner side of the holder main body 78. The V gear 124 is formed on the whole in a disc shape which is coaxial with the spool 26. External teeth are formed at fixed intervals at the outer peripheral portion of the V gear 124.

Figure 3:
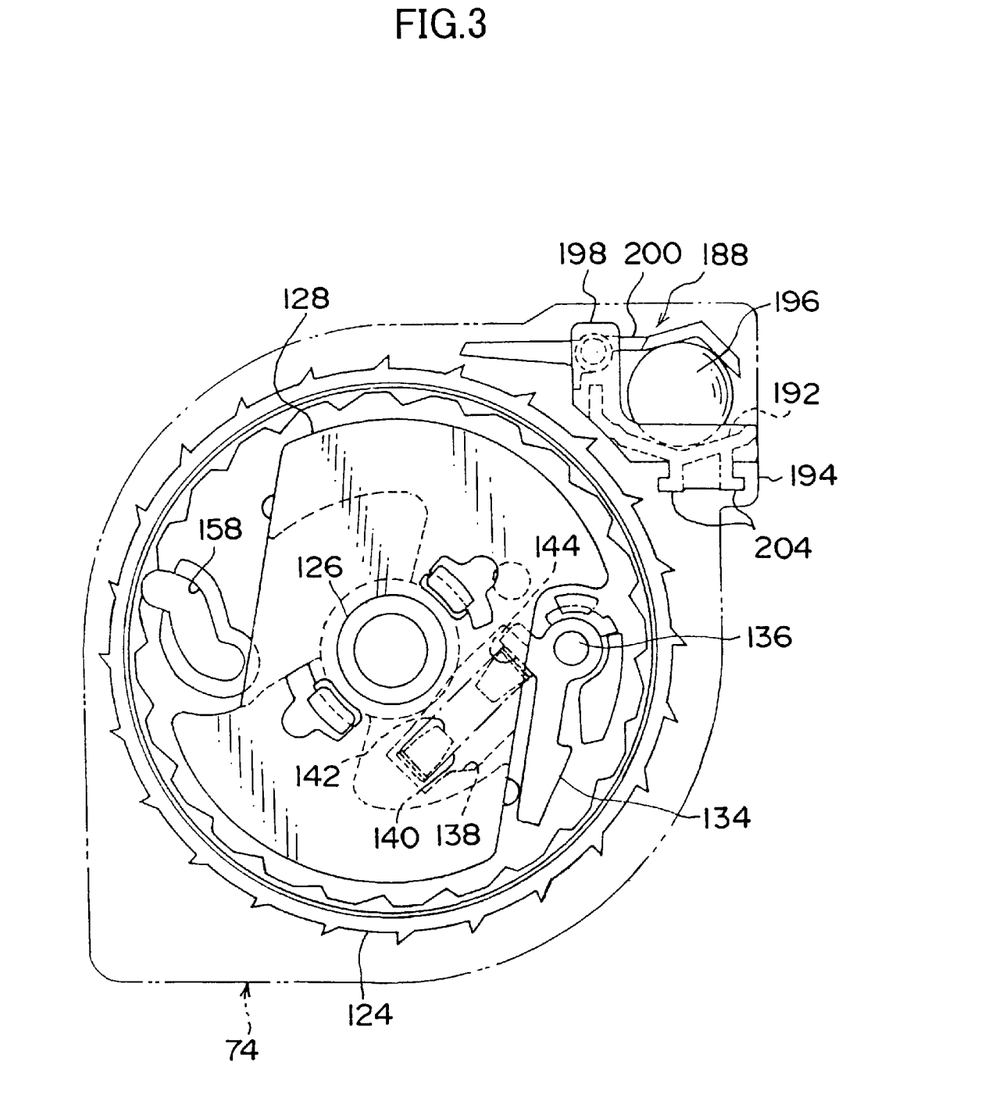
FIG. 3 is a diagram showing a rotating body from the side of a frame and along an axial direction of the take-up shaft.

As shown in FIG. 1 and FIG. 3, a circular hole is formed at the central portion of the V gear 124. A hollow cylindrical boss 126 is formed coaxially at the leg plate 14 side surface of the V gear 124 in correspondence with the hole. The inner diameter of the boss 126 is extremely slightly smaller than the shaft 66 of the spool main body 28. In a state in which the shaft 66 passes through the boss 126, the V gear 124 is shaft-supported so as to be rotatable coaxially with and relative to the spool 26.

An inertial plate (inertial mass) 128 serving as an inertial mass body is shaft-supported at the boss 126 so as to be freely rotatable over a predetermined range. A pair of restricting holes 130 are formed in the V gear 124. The restricting holes 130 are curved around the center of the V gear 124. The restricting holes 130 are elongated holes whose longitudinal directions run along the peripheral direction of the V gear 124. The restricting holes 130 are formed so as to oppose one another around the center of the V gear 124. A pair of projections 132 formed at the inertial plate 128 enter into the restricting holes 130. In this way, the relative rotation of the inertial plate 128 with respect to the V gear 124 is restricted until the time that the projections 132 interfere with the longitudinal direction end portions of the restricting holes 130.

A lever 134 serving as a restricting member is provided at a side of the inertial plate 128. A pin 136 which stands erect at the V gear 124 enters into the proximal end portion of the lever 134. The lever 134 is shaft-supported by the pin 136 so as to be swingable over a predetermined range.

A spring accommodating hole 138 is formed at a side of the pin 136 in the V gear 124. A compression coil spring 140 is disposed at the inner side of the accommodating hole 138. A holding projection 142 is formed to project from one portion of the inner periphery of the spring accommodating hole 138. The holding projection 142 enters into the inner side of the compression coil spring 140 from one end of the compression coil spring 140, and supports the compression coil spring 140.

At the other end side of the compression coil spring 140, a vertical wall 144 formed at the lever 134 enters into the spring accommodating hole 138. The other end of the compression coil spring 140 is pressed into contact with the vertical wall 144.

The urging force of the compression coil spring 140 acts on the lever 134 such that the lever 134 interferes with a side end portion of (a portion of the outer periphery of) the inertial plate 128. Usually, the inertial plate 128 is rotated by the urging force of the compression coil spring 140, until the projections 132 interfere with ones of ends of the restricting holes 130.

Accordingly, when the inertial plate 128 rotates relative to the V gear 124, the rotation is against the urging force of the compression coil spring 140. Due to the inertial plate 128 rotating relative to the V gear 124 against the urging force of the compression coil spring 140, the lever 134, which is pressed by a side end portion of (a portion of the outer periphery of) the inertial plate 128, swings around the pin 136.

Internal ratchet teeth (not shown) are formed at the inner peripheral portion of the holder main body 78, so as to correspond to the distal end portion of the lever 134 which swings against the urging force of the compression coil spring 140. When the lever 134 swings against the urging force of the compression coil spring 140, the ratchet teeth of the holder main body 78 interfere with the distal end portion of the lever 134.

Figure 4:
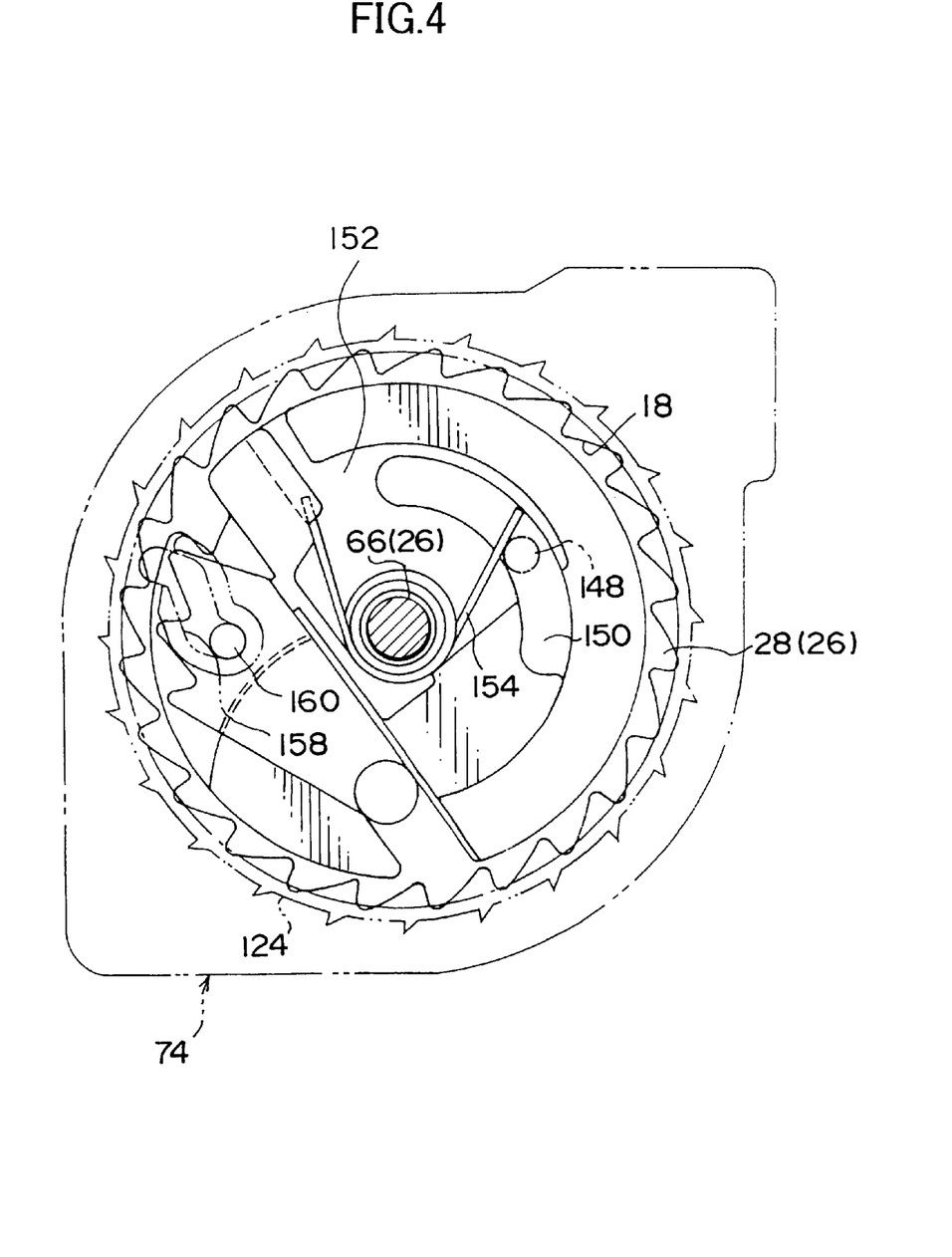
FIG. 4 is a diagram of the take-up shaft as seen from the lock device and along the axial direction of the take-up shaft.

A rod 148 is formed to project from the leg plate 14 side surface of the V gear 124. As shown in FIG. 4, the rod 148 enters into a guide groove 150 formed at the leg plate 14 side end portion of the spool main body 28. The guide groove 150 is curved, with the center of curving thereof being the axial center of the spool main body 28. When the V gear 124 rotates coaxially and relatively with respect to the spool 26, the rod 148 moves within the guide groove 150.

A spring accommodating portion 152 is formed at the leg plate 14 side end portion of the spool main body 28, so as to overlap the guide groove 150. A torsion coil spring 154 is accommodated in the spring accommodating portion 152.

One end of the torsion coil spring 154 press-contacts the inner wall of the spring accommodating portion 152, whereas the other end of the torsion coil spring 154 press-contacts the outer peripheral portion of the rod 148 and urges the rod 148 (i.e., the V gear 124) in a predetermined rotational direction.

A guide hole 158, which is bent in a crank shape at two places at the intermediate portion in the longitudinal direction thereof, is formed in the V gear 124. The guide hole 158 is formed at a position which is offset toward the outer side in the radial direction of the V gear 124 with respect to the center of the V gear 124. An engaging pin 160, which is formed to project from the lock plate 54 which is positioned relatively at the leg plate 14 side among the above-described pair of lock plates 54, enters into the guide hole 158.

The guide hole 158 is formed such that, in a state in which the lock plates 54 are accommodated in the accommodating grooves 56, the engagement pin 160 is positioned at one end in the longitudinal direction of the guide hole 158. When the V gear 124 rotates relatively in a predetermined direction with respect to the spool 26, the inner peripheral portion of the guide hole 158 interferes with the engagement pin 160 so as to move the lock plate 54, and the lock plates 54 come out from the accommodating grooves 56.

As shown in FIG. 1, flange portions 162, 164 extend from the open end side of the holder main body 78 in mutually opposite directions across the holder main body 78. At the one flange portion 162, a supporting stand 166 is formed continuously from the outer peripheral portion of the holder main body 78. A slotted pin 168, whose axial direction is substantially the same direction as the axial direction of the spool 26, stands erect at the supporting stand 166. A spring holding piece 170 serving as a spring holding member is provided at the slotted pin 168.

Figure 5:
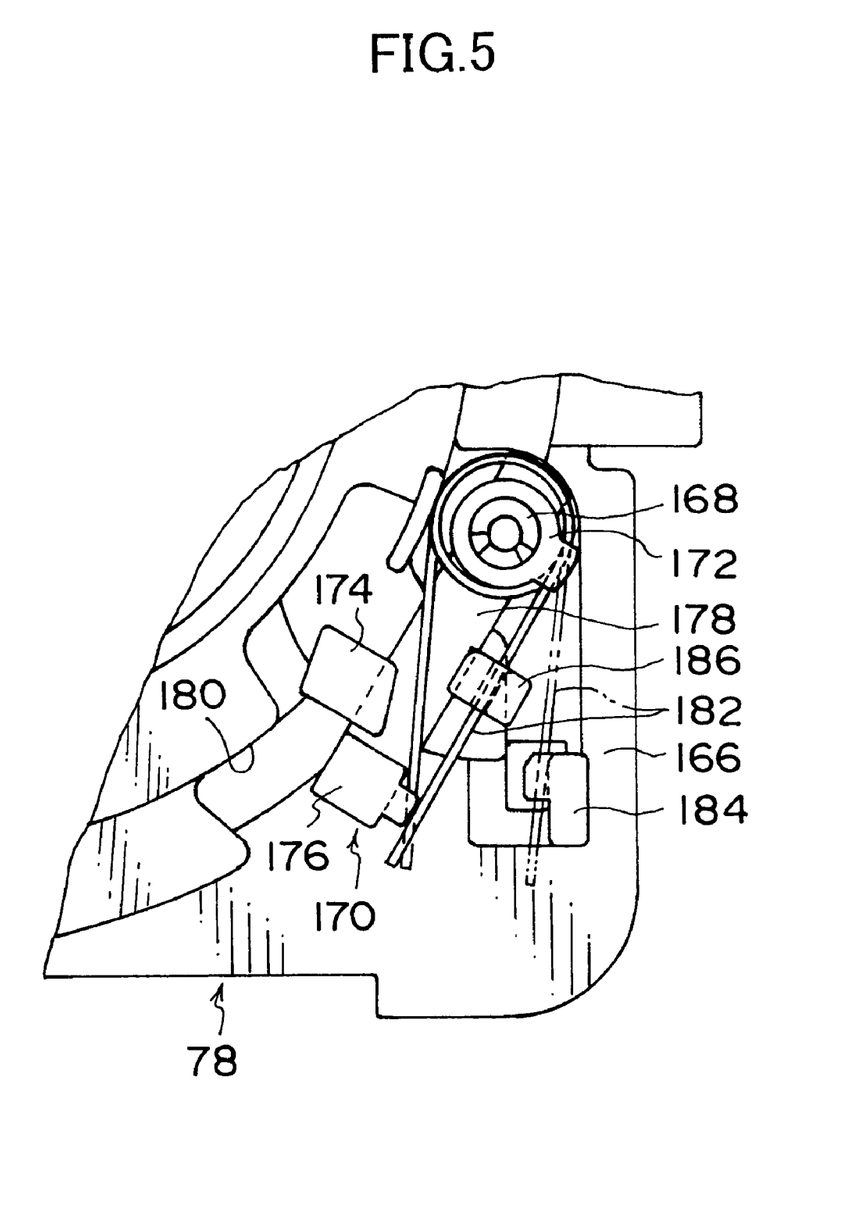
FIG. 5 is a plan view of a spooling holding member.

As shown in FIG. 5, the spring holding piece 170 has a hollow cylindrical boss 172 serving as a holding member main body. The inner diameter of the boss 126 is extremely slightly smaller than the outer diameter of the slotted pin 168 at the proximal end side thereof. The spring holding piece 170 is mounted to the slotted pin 168 such that the slotted pin 168 passes through the boss 172. In this way, the spring holding piece 170 is shaft-supported so as to be freely rotatable over a predetermined range around the slotted pin 168. Further, the outer diameter of the slotted pin 168 increases from the portion thereof where a cut-out is formed. Therefore, due to the distal end side of the slotted pin 168 interfering with the boss 172, the boss 172 is prevented from coming out.

An engagement piece 174 and an engagement piece 176 serving as urged portions are provided at sides of the boss 172 in a direction orthogonal to the axis. The engagement piece 174 and the engagement piece 176 are integrally connected to the boss 172 via a connecting piece 178 which extends from the outer peripheral portion of the boss 172 at an intermediate portion in the axial direction of the boss 172.

The engagement piece 174 is formed in a block shape. Due to the boss 172 rotating around the slotted pin 168 in a predetermined direction, the boss 172 approaches the outer peripheral portion of the rotating plate 104. When the engagement piece 174 opposes the cut-out portion 112 of the rotating plate 104 along the direction of rotation around the slotted pin 168, the engagement piece 174 enters into the cut-out portion 112. In the state in which the engagement piece 174 has entered into the cut-out portion 112, the engagement piece 174 opposes the interfering wall 116 along one rotational direction of the rotating plate 104, and the engagement piece 174 can interfere with the interfering wall 116.

The engagement piece 176 is formed on the whole in the shape of a square bar whose longitudinal direction runs along the axial direction of the boss 172. Due to the boss 172 rotating in a predetermined direction around the slotted pin 168, the distal end side of the engagement piece 176 moves along the outer peripheral portion of the supporting stand 166.

An opening portion 180 is formed in the holder main body 78 so as to correspond to the engagement piece 176. When the boss 172 rotates in a predetermined direction around the slotted pin 168, the distal end side of the engagement piece 176 enters, via the opening portion 180, into the inner side of the holder main body 78, and engages with the external teeth formed at the outer peripheral portion of the V gear 124.

A torsion coil spring 182 is mounted to the boss 172 of the spring holding piece 170. One end of the torsion coil spring 182 engages with an engagement wall 184 which serves as an interfering portion and which stands erect at the supporting stand 166. The other end of the spring 182 engages with the proximal end portion of the engagement piece 176. In this way, the spring holding piece 170 is always urged in the direction in which the engagement piece 174 approaches the outer peripheral portion of the rotating plate 104 and the engagement piece 176 enters into the opening portion 180.

A holding portion 186, which is curved in a hook shape, is formed at the connecting piece 178 of the spring holding piece 170 at the side opposite the urging direction of the torsion coil spring 182, further toward one end of the torsion coil spring 182 than the engagement wall 184. The holding portion 186 is formed so as to correspond to one end of the torsion coil spring 182. Due to the one end of the torsion coil spring 182 being made to engage with the holding portion 186, the one end of the torsion coil spring 182 can be held at the holding portion 186 without interfering with the engagement wall 184.

Because the holding portion 186 is merely formed so as to be bent in a hook shape, even if the holding portion 186 holds the one end of the torsion coil spring 182, the holding of the one end of the torsion coil spring 182 by the holding portion 186 can easily be released by pushing and elastically deforming the one end of the torsion coil spring 182 in the direction of bending of the distal end side of the holding portion 186.

An acceleration sensor 188 is disposed at the side of the flange portion 164, which is at the side of the holder main body 78 opposite the side at which the flange portion 162 is located.

The acceleration sensor 188 has a sensor housing 190. The acceleration sensor 188 also has a placement stand 194 having a placement portion 192 which is substantially concave and opens toward one side in the direction of thickness. A steel ball 196 serving as an inertial mass body is placed on the placement stand 194. Further, a supporting wall 198 stands erect so as to be directed toward the opening direction side of the placement portion 192, from one end of the placement stand 194. A sensor lever 200 serving as a limiting member is shaft-supported so as to be freely rotatable at the distal end portion of the supporting wall 198. One end side of the sensor lever 200, which is further toward one end than the shaft-supported portion supported by the supporting wall 198, is positioned at the side of the steel ball 196 on the placement portion 192 opposite the side at which the placement portion 192 is provided. When the steel ball 196 rises up along the inclined surface or curved surface of the placement portion 192, the one end side of the sensor lever 200 is pushed from beneath by the steel ball 196.

An opening portion is formed in the holder main body 78 so as to correspond to the other end side of the sensor lever 200. When the one end side of the sensor lever 200 is pushed up by the steel ball 196, the other end side of the sensor lever 200 enters into the inner side of the holder main body 78 via this opening portion, and engages with the external teeth of the V gear 124.

Substantially flat-plate-shaped engagement pieces 204 are formed at the placement stand 194 of the acceleration sensor 188. The engagement pieces 204 are formed so as to correspond to holding rails 206 which are provided erect at the flange portion 164. The sensor housing 190 is mounted to the sensor holder 74 by inserting the engagement pieces 204 into the holding rails 206 from the side of the flange portion 162 opposite the side at which the leg plate 14 is located, so as to make the holding rails 206 hold the both end portions in the transverse directions of the engagement pieces 204.

The sensor holder 74 has a sensor cover 208. The sensor cover 208 covers the acceleration sensor 188 and the rotating plates 90, 104 from the side of the holder main body 78 opposite to the side at which the leg plate 14 is located.

A pair of holding claws 210 are formed at the outer peripheral portion of the sensor cover 208. The holding claws 210 are formed to correspond to the holding projections 24 of the leg plate 14. A pair of holding claws 212 serving as engagement portions are formed at the outer peripheral portion of the sensor holder 74, so as to correspond to the holding projections 24 of the leg plate 14.

The holding claws 210 and the holding claws 212 are formed in states of being offset from one another by 90° on an imaginary circumference whose center is the axial center of the V gear 124, in the state in which the holding claws 210 and the holding claws 212 mount the sensor cover 208 to the sensor holder 74. Accordingly, it is possible for the holding claws 210, 212 to engage with the holding projections 24 formed at the substantially central portions of the respective sides of the leg plate 14, when the configuration of the leg plate 14 is presumed to be square. Due to the holding claws 210, 212 engaging with the holding projections 24, the sensor holder 74 and the sensor cover 208 are mounted and fixed to the frame 12.

<Operation and Effects of the Present Embodiment>
(Summary of Operation)

A vehicle occupant who is seated on the seat pulls out the webbing belt 32 which is accommodated in a state of being taken-up on the spool 26 in the present webbing retractor 10. In the state in which the vehicle occupant has pulled the webbing belt 32 to span across the front side of his/her body, the vehicle occupant anchors the tongue plate provided at the webbing belt 32 with the buckle device provided at the side of the seat. The webbing belt 32 is thereby set in a state of being applied to the vehicle occupant, and the body of the vehicle occupant is restrained by the webbing belt 32.

In this state, if the vehicle rapidly decelerates, the body of the vehicle occupant attempts to move toward the front of the vehicle due to inertia. The body of the vehicle occupant thereby attempts to pull the webbing belt 32 out further.

However, when the vehicle rapidly decelerates in this way, the steel ball 196 of the acceleration sensor 188 moves due to the inertia at the time of the rapid deceleration, and rises up along the inclined surface or the curved surface of the placement portion 192 so as to push the one end side of the sensor lever 200 upward. In this way, the sensor lever 200 rotates around the portion which is shaft-supported by the supporting wall 198, and the other end side of the sensor lever 200 enters into the holder main body 78 and engages with the external teeth formed at the outer peripheral portion of the V gear 124.

The V gear 124 can rotate relative to the spool 26, and, due to the urging force of the torsion coil spring 154, basically rotates so as to follow the rotation of the spool 26. Thus, essentially, if the body of the vehicle occupant were to attempt to pull the webbing belt 32 out so as to attempt to rotate the spool 26, the V gear 124 also would attempt to rotate in the pull-out direction interlockingly with the rotation of the spool 26.

However, due to the sensor lever 200 engaging with the external teeth of the outer peripheral portion of the V gear 124 as described above, even if the spool 26 attempts to rotate in the pull-out direction, the V gear 124 resists the urging force of the torsion coil spring 154 and rotates relative to the spool 26. Due to the relative rotation between the spool 26 and the V gear 124 which arises in this way, the engagement pin 160 formed to project from the lock plate 54 moves within the guide hole 158 formed in the V gear 124. The lock plates 54 accommodated within the accommodating groves 56 are pulled-out from the accommodating grooves 56, and the ratchets 58 formed at the lock plates 54 mesh with the internal teeth 20 of the ratchet holes 18 formed at the leg plates 14, 16. In this way, rotation of the spool 26 in the pull-out direction is restricted, and pulling-out of the webbing belt 32 is limited. Thus, the body of the vehicle occupant can be even more reliably restrained.

Not only when the vehicle is traveling or the like, but also in cases in which an attempt is made to suddenly pull the webbing belt 32 out so as to attempt to suddenly rotate the spool 26 in the pull-out direction, the V gear 124 suddenly attempts to rotate in the pull-out direction interlockingly with the rotation of the spool 26. The inertial plate 128 cannot follow the V gear 124 by inertia. Thus, relative rotation between the inertial plate 128 and the V gear 124 arises.

Due to this relative rotation between the inertial plate 128 and the V gear 124, the inertia plate 128 swings the lever 134 against the urging force of the compression coil spring 140. In this way, the leading end side of the lever 134 interferes with the ratchet teeth formed at the inner peripheral portion of the holder main body 78. Due to the lever 134 interfering with the ratchet teeth of the holder main body 78, rotation of the V gear 124 is restricted, and relative rotation between the V gear 124 and the spool 26 arises. In this way, in the same way as when the steel ball 196 of the acceleration sensor 188 moves, the lock plates 54 are pulled-out from the accommodating grooves 56, and the ratchets 58 formed at the lock plates 54 mesh with the internal teeth 20 of the ratchet holes 18 formed in the leg plates 14, 16. In this way, rotation of the spool 26 in the pull-out direction is restricted, and pulling-out of the webbing belt 32 is limited. Thus, the body of the vehicle occupant can be even more reliably restrained.

On the other hand, in a usual state, if the spool 26 is rotated in the direction of pulling-out the webbing belt 32, the gear 82 rotates coaxially and integrally with the spool 26. Further, due to the gear 82 rotating, the large diameter gear 88 which meshes with the gear 82 rotates in a decelerated (reduced) state. Moreover, the small diameter gear 102, which is formed integrally and coaxially with the large diameter gear 88, rotates. The rotating plate 90, whose internal teeth mesh with the small diameter gear 102, rotates.

Here, if the webbing belt 32 is pulled out by a given amount (e.g., the entire amount thereof), the engagement piece 174 and the cut-out portion 112 of the rotating plate 104 oppose one another along the urging direction of the torsion coil spring 182. Further, in the state in which the webbing belt 32 is pulled-out by the given amount, the cam 122 of the rotating plate 90, which pushes the interfering wall 116 corresponding to the cut-out portion 112, exists within the cut-out portion 112. Therefore, the engagement piece 174 cannot enter into the cut-out portion 112.

In this state, when the spool 26 rotates by a slight amount in the take-up direction, the cam 122 rotates with respect to the cut-out portion 112. Therefore, due to the urging force of the torsion coil spring 182, the engagement piece 174 enters into the cut-out portion 112. Accompanying this entry, the engagement piece 176 enters into the holder main body 78 via the opening portion 180, and the engagement piece 176 interferes with the external teeth of the V gear 124.

Accordingly, in this state, if an attempt is made to rotate the spool 26 in the pull-out direction, the lock plates 54 accommodated in the accommodating grooves 56 are pulled out from the accommodating grooves 56. The ratchets 58 formed at the lock plates 54 mesh with the internal teeth 20 of the ratchet holes 18 formed in the leg plates 14, 16. Therefore, it is not possible to rotate the spool 26 in the pull-out direction, i.e., it is not possible to pull the webbing belt 32 out from the spool 26.

On the other hand, in this state, when a given amount (e.g., the entire amount) of the webbing belt 32 is to be taken-up onto the spool 26, the interfering wall 120 is pushed by the cam 122 and the rotating plate 104 rotates. In this way, the interfering wall 116 pushes the engagement piece 174 and makes the engagement piece 174 separate from the cut-out portion 112. Accordingly, in this state, the interference of the engagement piece 176 with respect to the external teeth of the V gear 124 is cancelled. Thus, the spool 26 can rotate in the pull-out direction.

(Characteristic Operation and Effects Relating to Spool 26)

Next, among the characteristic operation and effects of the present embodiment, the characteristic operation and effects relating to the spool 26 will be described.

As described above, when the webbing belt 32 is pulled out, the spool 26 rotates in the pull-out direction. When the webbing belt 32 is to be accommodated, the spool 26 rotates in the take-up direction. When the spool 26 rotates, the spool 26 attempts to shift in the axial direction, depending on the way in which force is applied to the spool 26.

However, in the present embodiment, when the spool 26 attempts to shift in the axial direction, the restricting walls 46 of the stopper plate 36 provided at the belt insert-through hole 30 interfere with the leg plates 14, 16. In this way, shifting of the spool 26 along the axial direction is prevented. Thus, it is possible to prevent the spool 26 from coming out from the ratchet holes 18. Further, it is possible to prevent an excessive load from being applied to the respective parts forming the lock mechanism 72 including the gear 82 which is connected to the shaft 66 of the spool 26, which application of load would be caused by shifting of the spool 26 in the axial direction. As a result, the present webbing retractor 10 can be operated reliably over a long period of time.

Here, the assembling of the stopper plate 36 to the spool 26 can be carried out merely by inserting the stopper plate 36 into the belt insert-through hole 30. After insertion, the stopper plate 36 is prevented from falling out due to the stopper shaft 34, which is for preventing the webbing belt 32 from coming out from the belt insert-through hole 30, interfering with the connecting plate 38 of the stopper plate 36 indirectly via the webbing belt 32.

In this way, in the present embodiment, one end side of the spool 26 is passed through the ratchet hole 18 of either one of the leg plates 14, 16, and then the one end side of the spool 26 is passed through the ratchet hole 18 of the other of the leg plates 14, 16 (take-up shaft pass-through step). In this state, by merely inserting the stopper plate 36 into the belt insert-through hole 30 (take-up shaft stopper device mounting step), shifting of the spool 26 along the axial direction can easily be prevented. Thus, in the present embodiment, the number of steps for assembling the spool 26 can be reduced. In other words, in this way, regardless of the fact that shifting of the spool 26 along the axial direction can be restricted, the mounting of the spool 26 into the frame 12 is the simple work of passing one end side of the spool 26 through the ratchet holes 18 of the leg plates 14, 16 along the axial direction of the spool 26. Accordingly, the number of processes for mounting the spool 26 to the frame 12 can be reduced.

Further, as described above, the stopper plate 36 is mounted and held at the structure for preventing the webbing belt 32 from coming out, which structure is the belt insert-through hole 30 and the stopper shaft 34. Thus, there is no need for a special structure for mounting or holding the stopper plate 36. In this way, the cost can be made to be less expensive.

In the present embodiment, as described above, in the state in which the ratchets 58 of the lock plates 54 mesh with the internal teeth 20 of the ratchet holes 18 formed in the leg plates 14, 16, the restricting plates 62 formed between the external teeth of the ratchets 58 oppose the internal teeth 20 of the ratchet holes 18, along the axial direction of the spool 26. Therefore, in this state, when the spool 26 attempts to shift in the axial direction, not only the restricting walls 46, but also the restricting plates 62 interfere with the internal teeth 20, and displacement of the spool 26 along the axial direction thereof is restricted.

In this way, even if the spool 26 attempts to shift in the axial direction due to a large force due to sudden rotation of the spool 26 in the pull-out direction, displacement of the spool 26 can reliably be restricted by the restricting walls 46 and the restricting plates 62.

(Characteristic Operation and Effects Relating to the Assembling of the Respective Members of the Lock Mechanism 72)

Next, among the characteristic operation and effects of the present embodiment, the characteristic operation and effects relating to the assembling of the lock mechanism 72 will be described.

As described above, in the lock mechanism 72 of the present webbing retractor 10, the shaft 86 which shaft-supports the large diameter gear 88, the shaft receiving portion 96 which shaft-supports the rotating plate 90, the shaft receiving portion 110 which shaft-supports the rotating plate 104, the slotted pin 168 which shaft-supports the spring holding plate 170, and the holding rails 206 which hold the sensor housing 190, are all formed at regions facing the side of the sensor holder 74 opposite the side at which the leg plate 14 is located.

Further, the directions of assembling the large diameter gear 88, the rotating plate 90, the rotating plate 104, and the spring holding piece 170 with respect to the shaft 86, the shaft receiving portion 96, the shaft receiving portion 110, the slotted pin 168, and the holding rails 206, are all at the side of the sensor holder 74 opposite the side at which the leg plate 14 is located, and are all the same direction.

Thus, the assembly work is easy. Further, when these parts are assembled automatically such as by a robot or the like, because the directions of assembling these respective parts are the same one direction, the operation of the robot is simplified, and the manufacturing of the robot is thereby simplified. Thus, automation is facilitated, and the costs related thereto can be made to be less expensive.

Further, after the large diameter gear 88, the rotating plate 90, the rotating plate 104, and the spring holding piece 170 have been assembled, the sensor cover 208 can be mounted to the sensor holder 74 from the same direction so as to cover the sensor holder 74. Thus, when assembling the respective parts and the sensor cover 208 with the sensor holder 74, there is no need to invert the sensor holder 74 or the like. For this reason as well, the assembly work is facilitated, and automation by a robot or the like is easy.

Moreover, the torsion coil spring 182 is mounted to the boss 172 of the spring holding piece 170, and one end of the torsion coil spring 182 is made to be the engagement wall 184. Here, due to the holding portion 186 formed at the spring holding piece 170 engaging one end of the torsion coil spring 182, the holding portion 186 can hold the one end of the torsion coil spring 182 without the engagement wall 184 interfering.

Accordingly, when assembling the spring holding piece 170 with the slotted pin 168, if the holding portion 186 is made to hold the one end of the torsion coil spring 182 in advance, at the time of assembling the spring holding piece 170 with the slotted pin 168, there is no need to displace the one end of the torsion coil spring 182 against the urging force of the torsion coil spring 182 in order to engage the one end of the torsion coil spring 182 with the engagement wall 184.

In this way, in the state in which the holding portion 186 is made to hold the one end of the torsion coil spring 182, the spring holding piece 170 is assembled with the slotted pin 168. Thereafter, if the one end of the torsion coil spring 182 is pushed and is made to come out from the holding portion 186, the one end of the torsion coil spring 182 engages with the engagement wall 184 due to its own urging force.

In this way, in the present webbing retractor 10, assembly of the spring holding piece 170 to the slotted pin 168 can be carried out easily, and the number of processes for assembling the torsion coil spring 182 can be reduced.

Further, when making the holding portion 186 hold the one end of the torsion coil spring 182, the one end is displaced against the urging force of the torsion coil spring 182. However, this operation itself can be carried out in advance in a process separate from the process of assembling the large diameter gear 88, the rotating plates 90, 104, the spring holding piece 170 and the like. Thus, when the holding portion 186 is made to hold the one end of the torsion coil spring 182, the rotating plates 90, 104 and the sensor holder 74 (the engagement wall 184 in particular) do not interfere, and the holding portion 186 can easily be made to hold the one end of the torsion coil spring 182.

(Characteristic Operation and Effects Relating to the Assembling of the Lock Mechanism 72)

Next, the characteristic operation and effects relating to the assembling of the lock mechanism 72 to the frame 12 will be described.

As described above, in the present webbing retractor 10, the leg plate 14 of the frame 12 is formed in a substantially square shape, and the holding projections 24 are formed at the substantially central portions of the four sides thereof. By engaging the holding claws 210, 212 with the holding projections 24, the sensor holder 74 and the sensor cover 208 are mounted to the leg plate 14.

Figure 6:
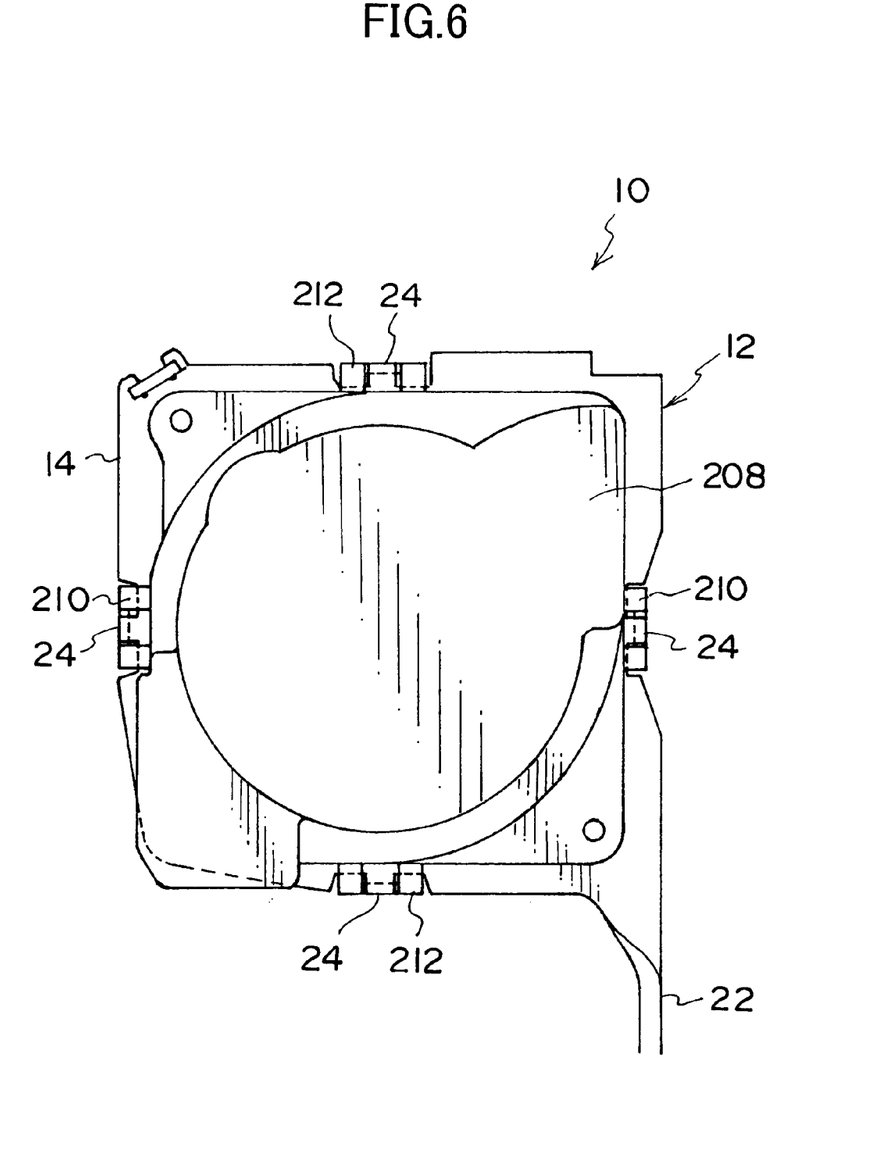
FIG. 6 is a diagram showing a standard assembled state of a supporting member (sensor holder) with respect to a leg plate.
Figure 7:
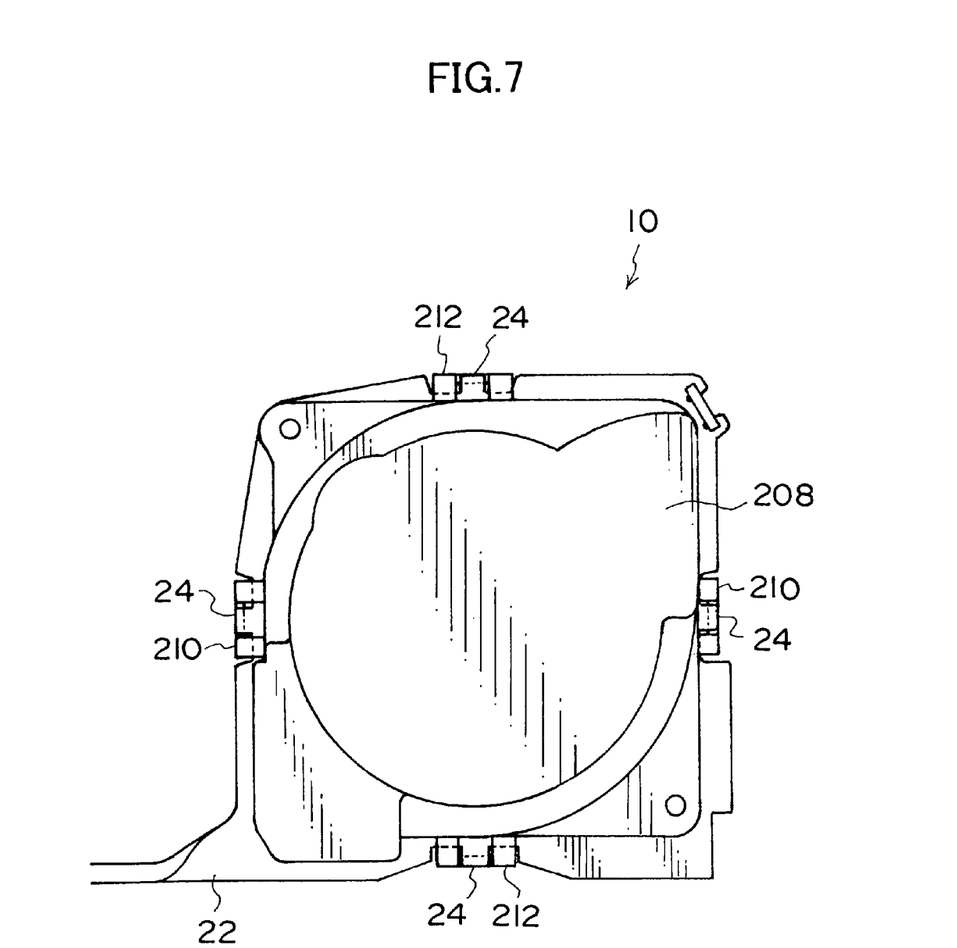
FIG. 7 is a diagram corresponding to FIG. 6 and illustrating a state in which the supporting member (sensor holder) is assembled to the leg plate of the frame which has been rotated by 90° around the axis of the take-up shaft.

Here, as described above, the holding projections 24 are formed at the substantial centers of the respective sides of the leg plate 14 which is formed in a substantially square shape. Therefore, even if the sensor holder 74 and the sensor cover 208 are in a state of having been rotated substantially 90° around the center of the leg plate 14, the holding claws 210, 212 can be made to engage with the holding projections 24, and the sensor holder 74 and the sensor cover 208 can be mounted to the leg plate 14.

Moreover, the center of the leg plate 14, when the configuration of the leg plate 14 is presumed to be a substantial square, substantially corresponds to the axial center of the V gear 124. Thus, as described above, even if the sensor holder 74 and the sensor cover 208 are rotated substantially 90° around the center of the leg plate 14, the respective parts assembled into the sensor holder 74 are not displaced with respect to the V gear 124 in the radial direction of the V gear 124. In this way, even if the frame 12 is rotated substantially 90° around the axial center of the spool 26 (i.e., the axial center of the V gear 124), the positions of the sensor holder 74 and the sensor cover 208 do not change, and the position of the acceleration sensor 188 as well does not change.

Accordingly, even if the same frame 12 is applied to a vehicle body at which the assembled position of the frame 12 is different by substantially 90° around the axial center of the spool 26 (i.e., around the axial center of the V gear 124), the sensor holder 74 and the sensor cover 208 can be applied as is, merely by rotating the sensor holder 74 and the sensor cover 208 by 90° with respect to the frame 12. Further, the respective parts assembled to the sensor holder 74 also can be applied as is.

In this way, the present webbing retractor 10 can be applied as is even to a vehicle in which the assembled position of the frame 12 is different, without carrying out any substantial design changes. Therefore, costs can be reduced.

As described above, in the webbing retractor relating to the present invention, with a simple structure, displacement of a take-up shaft in the axial direction with respect to a frame can be suppressed, and further, the take-up shaft can easily be mounted to the frame.

What is claimed is:

1. A webbing retractor comprising:
    a take-up shaft on which a proximal end portion of an elongated, strip-shaped webbing belt is anchored, the take-up shaft taking-up the webbing belt from a proximal end side of the webbing belt by rotating in a take-up direction which is one direction around an axial center of the take-up shaft;
    a frame including a pair of leg plates which oppose one another along an axial direction of the take-up shaft, the frame indirectly supporting the take-up shaft at the leg plates; and
    a take-up shaft stopper device mounted to one portion of an outer periphery of the take-up shaft from a direction orthogonal to the axial direction of the take-up shaft, and a restricting wall is formed at the take-up shaft stopper device, and in a state in which the take-up shaft stopper device is mounted, the restricting wall extends further than the take-up shaft in the direction orthogonal to the axial direction of the take-up shaft and opposes the leg plates along the axial direction of the take-up shaft.

2. The webbing retractor of claim 1, wherein a belt insert-through hole is formed in the take-up shaft, both ends of the belt insert-through hole are open at an outer peripheral portion of the take-up shaft, the proximal end side of the webbing belt is inserted through from one open end of the belt-insert through hole, and the take-up shaft stopper device is mounted from another open end of the belt-insert through hole, and the webbing retractor further comprises a belt stopper device which engages the proximal end side of the webbing belt which has been inserted through the belt insert-through hole from the other open end of the belt insert-through hole, and which, in an engaged state, interferes one of directly and indirectly with an inner wall of the belt-insert through hole so as to prevent the webbing belt from coming out from the one open end of the belt insert-through hole, and which interferes with the take-up shaft stopper device from the other open end of the belt-insert through hole so as to prevent the take-up shaft stopper device from coming out from the other open end of the belt-insert through hole.

3. The webbing retractor of claim 2, wherein the take-up shaft is a spool, and the spool includes a spool main body, and the belt insert-through hole is formed in the spool main body, and both ends of the belt insert-through hole are open at an outer peripheral portion of the spool main body.

4. The webbing retractor of claim 3, wherein the belt stopper device includes a substantially solid cylindrical stopper shaft, and the stopper shaft is provided at one end of the belt insert-through hole, and an outer diameter of the stopper shaft is smaller than an opening width of the one end of the belt insert-through hole and larger than an opening width of another end of the belt insert-through hole.

5. The webbing retractor of claim 4, wherein the webbing belt is inserted into the one end of the belt insert-through hole from the other end of the belt insert-through hole, and the stopper shaft is formed in a substantially closed annular form and is inserted in an inner side of the proximal end portion of the webbing belt.

6. The webbing retractor of claim 1, wherein the take-up shaft is a spool, and the spool includes a spool main body, and the belt insert-through hole is formed in the spool main body, and both ends of the belt insert-through hole are open at an outer peripheral portion of the spool main body.

7. The webbing retractor of claim 6, wherein the take-up shaft stopper device includes a stopper plate, and the stopper plate is provided at the belt insert-through hole of the spool.

8. The webbing retractor of claim 7, wherein the stopper plate includes a connecting plate whose longitudinal direction runs along an axial direction of the spool main body, and a longitudinal direction dimension of the connecting plate is slightly smaller than a longitudinal direction dimension of the opening of the belt insert-through hole.

9. The webbing retractor of claim 8, wherein the connecting plate of the stopper plate includes a group of interfering walls, and the interfering walls are formed so as to be bent toward one side in a direction of thickness of the connecting plate from both end portions in a longitudinal direction of the connecting plate, and each interfering wall includes a narrow width portion and a wide width portion, and a width of the narrow width portion is substantially the same as a width of the other end of the belt insert-through hole, and a width of the wide width portion is substantially the same as a width of the one end of the belt insert-through hole.

10. A webbing retractor comprising:
a take-up shaft on which a proximal end portion of an elongated, strip-shaped webbing belt is anchored, the take-up shaft taking-up the webbing belt from a proximal end side of the webbing belt by rotating in a take-up direction which is one direction around an axial center of the take-up shaft;
a frame structured so as to include a pair of leg plates which are provided so as to oppose one another along an axial direction of the take-up shaft, an interval between the leg plates being shorter than a dimension between axial direction end portions of the take-up shaft, and a hole is formed in each of the leg plates, and the take-up shaft can be made to pass through the holes, and internal teeth are formed at an inner peripheral portion of at least one of the holes, and the frame indirectly supports the take-up shaft which has been passed through the holes;
a lock device structured so as to include a lock member which is provided at the take-up shaft so as to be movable in directions of approaching and moving away from inner peripheral portions of the holes formed in the leg plates, and a plurality of external teeth which can engage with the internal teeth are formed at the lock member, and due to the lock member moving so as to approach the inner peripheral portions of the holes, the lock member engages with the internal teeth formed at the inner peripheral portion of the hole and restricts rotation of the take-up shaft in a direction of pulling-out the webbing belt, and the lock device moves the lock member to approach the inner peripheral portions of the holes under a predetermined condition; and
a stopper portion provided at the take-up shaft so as to be movable in directions of approaching and moving away from a restricting position at a side, along a direction in which the leg plates oppose one another, of the leg plate which includes the internal teeth, one of integrally with movement of and interlockingly with movement of the lock member in directions of approaching and moving away from the inner peripheral portions of the holes.

11. The webbing retractor of claim 10, wherein the stopper portion is formed between the plurality of external teeth.

12. The webbing retractor of claim 11, wherein the lock member includes a lock plate, and the stopper portion includes a restricting plate, and the restricting plate extends from an end portion of the lock plate.

13. The webbing retractor of claim 12, wherein the plurality of external teeth include a ratchet, and the ratchet is formed at a portion of an outer periphery of the lock plate.

14. The webbing retractor of claim 10, wherein the lock member includes a lock plate, and the stopper portion includes a restricting plate, and the restricting plate extends from an end portion of the lock plate.

15. A method of assembling a webbing retractor which is applied to a webbing retractor including:
a take-up shaft on which a proximal end portion of an elongated, strip-shaped webbing belt is anchored; and
a frame including a pair of leg plates which oppose one another along an axial direction of the take-up shaft, and an interval between the leg plates is smaller than an axial direction dimension of the take-up shaft, and a hole through which the take-up shaft can pass is formed in each of the leg plates, and the frame indirectly shaft-supports the take-up shaft at the pair of leg plates,
wherein the method of assembling a webbing retractor includes a step of mounting the take-up shaft to the frame, and the step of mounting the take-up shaft to the frame comprises:
a take-up shaft pass-through step of passing the take-up shaft, from one axial direction end side of the take-up shaft and along the axial direction of the take-up shaft, through the hole formed in one of the leg plates, from a side of the one of the leg plates which side is opposite a side at which another of the leg plates is provided, and passing the take-up shaft, from the one axial direction end side of the take-up shaft, through the hole formed in the other of the leg plates; and a take-up shaft stopper device mounting step of mounting a take-up shaft stopper device to one portion of an outer periphery of the take-up shaft, between the pair of leg plates and from a direction orthogonal to the axial direction of the take-up shaft, and making a restricting wall, which is formed at the take-up shaft stopper device and extends further toward an outer side in a direction orthogonal to the axial direction of the take-up shaft than the take-up shaft, oppose the leg plates along the axial direction of the take-up shaft.

16. The method of claim 15, wherein the holes of the leg plates are formed as ratchet holes including a plurality of internal teeth, and the take-up shaft is formed as a spool including a spool main body which is one of substantially solid cylindrical and substantially hollow cylindrical, and a maximum outer diameter of the spool main body is smaller than a substantial inner diameter of the ratchet holes.

17. The method of claim 16, further comprising a step of forming a belt insert-through hole, through which the webbing belt is inserted, in the spool main body, and the step of forming the belt insert-through hole includes forming the belt insert-through hole such that both ends of the belt insert-through hole are open at an outer peripheral portion of the spool main body, and an open longitudinal direction of the belt insert-through hole runs along an axial direction of the spool main body.

18. The method of claim 17, further comprising a step of providing, as one portion of the take-up shaft stopper device, a stopper plate including a connecting plate and a group of interfering walls, and a longitudinal direction of the connecting plate runs along the axial direction of the spool main body, and the connecting plate includes a longitudinal dimension which is slightly shorter than an open longitudinal dimension of the belt insert-through hole, and the interfering walls are formed so as to be bent along a direction of thickness of the connecting plate from both longitudinal direction end portions of the connecting plate.

19. The method of claim 18, further comprising the steps of providing a narrow width portion, a wide width portion, and a restricting wall at the interfering wall, and forming the wide width portion to include substantially a same width as a width of one end portion of the belt insert-through hole, and forming the narrow width portion to include substantially a same width as a width of another end portion of the belt insert-through hole, and forming the restricting wall to extend to and be positioned at an end portion of the wide width portion which end portion is at a side opposite a side at which the narrow width portion is provided.

20. The method of claim 17, further comprising a belt stopper device mounting step of providing a belt stopper device which prevents the webbing belt from coming out, and making the belt stopper device engage with the proximal end portion of the webbing belt which has been inserted through the belt insert-through hole, and in an engaged state, mounting the belt stopper device such that the belt stopper device interferes one of directly and indirectly with an inner wall of the belt insert-through hole.

\* \* \* \* \*